(12) United States Patent
Huang et al.

(10) Patent No.: US 11,704,551 B2
(45) Date of Patent: Jul. 18, 2023

(54) ITERATIVE QUERY-BASED ANALYSIS OF TEXT

(71) Applicant: Microsoft Technology Licensing, LLC, Redmond, WA (US)

(72) Inventors: Po-Sen Huang, Bellevue, WA (US); Jianfeng Gao, Woodinville, WA (US); Weizhu Chen, Kirkland, WA (US); Yelong Shen, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 928 days.

(21) Appl. No.: 15/639,705

(22) Filed: Jun. 30, 2017

(65) Prior Publication Data
US 2018/0101767 A1    Apr. 12, 2018

Related U.S. Application Data

(60) Provisional application No. 62/407,153, filed on Oct. 12, 2016.

(51) Int. Cl.
*G06N 3/08* (2006.01)
*G06F 16/33* (2019.01)
*G06N 3/04* (2006.01)
*G06N 5/04* (2006.01)
*G06N 3/044* (2023.01)

(52) U.S. Cl.
CPC .......... *G06N 3/08* (2013.01); *G06F 16/3347* (2019.01); *G06N 3/044* (2023.01); *G06N 5/04* (2013.01)

(58) Field of Classification Search
CPC .......... G06N 3/08; G06N 3/0045; G06N 5/04; G06F 16/3347
See application file for complete search history.

(56) References Cited

U.S. PATENT DOCUMENTS

| | | |
|---|---|---|
| 6,584,470 B2 | 6/2003 | Veale |
| 8,666,730 B2 | 3/2014 | Todhunter et al. |
| 9,275,341 B2 | 3/2016 | Cruse et al. |
| 9,418,066 B2 | 8/2016 | Bastide et al. |
| 2008/0104023 A1 | 5/2008 | Dawes |
| 2009/0106203 A1 | 4/2009 | Shi et al. |
| 2009/0287678 A1 | 11/2009 | Brown et al. |
| 2012/0077178 A1 | 3/2012 | Bagchi et al. |

OTHER PUBLICATIONS

Dong, "Language to Logical Form with Neural Attention", 2016 (Year: 2016).*
Hermann, "Teaching Machines to Read and Comprehend", pp. 1-9, 2015 (Year: 2015).*
Wang, "CNN-RNN: A Unified Framework for Multi-label Image Classification", pp. 2285-2294 (Year: 2016).*

(Continued)

*Primary Examiner* — Ann J Lo
*Assistant Examiner* — Van C Mang

(57) ABSTRACT

Techniques for iterative query-based analysis of text are described. According to various implementations, a neural network architecture is implemented receives a query for information about text content, and iteratively analyzes the content using the query. During the analysis a state of the query evolves until it reaches a termination state, at which point the state of the query is output as an answer to the initial query.

16 Claims, 6 Drawing Sheets

(56) References Cited

OTHER PUBLICATIONS

Mnih, "Recurrent Models of Visual Attention", 2014 (Year: 2014).*
Ilya Sutskever, "Sequence to Sequence Learning with Neural Networks", 2014 (Year: 2014).*
Zhang, "Towards Machine Translation in Semantic Vector Space", 2015 (Year: 2015).*
Romera-Paredes, "Recurrent Instance Segmentation", 2016 (Year: 2016).*
Juan Antonio Perez-Ortiz, "Kalman filters improve LSTM network performance in problems unsolvable by traditional recurrent nets", 2002 (Year: 2002).*
Junyoung Chung, "Hierarchical Multiscale Recurrent Neural Networks", 2016 (Year: 2016).*
"Google DeepMind Teaches Artificial Intelligence Machines to Read", https://www.technologyreview.com/s/538616/google-deepmind-teaches-artificial-intelligence-machines-to-read/, Published on: Jun. 17, 2015, 7 pages.

Li, et al., "Dataset and Neural Recurrent Sequence Labeling Model for Open-Domain Factoid Question Answering", In Journal of the Computing Research Repository, Jul. 2016, 10 pages.
Andreas, et al., "Learning to Compose Neural Networks for Question Answering", In Proceedings of North American Chapter of the Association for Computational Linguistics, Jun. 12, 2016., 10 pages.
Ku, et al., "Question Answering on Freebase via Relation Extraction and Textual Evidence", In Proceedings of the 54th Annual Meeting of the Association for Computational Linguistics, Aug. 7, 2016, 11 pages.
Hoque, et al., "An effective approach for relevant paragraph retrieval in Question Answering systems", In Proceedings of 18th International Conference on Computer and Information Technology, Dec. 21, 2015, pp. 44-49.
Roberts, et al., "Evaluating Passage Retrieval Approaches for Question Answering", In Proceedings of Advances in Information Retrieval, 26th European Conference on IR Research, Apr. 5, 2004, 13 pages.

* cited by examiner

ITERATIVE QUERY-BASED ANALYSIS OF TEXT

RELATED APPLICATION

This application claims priority under 35 U.S.C. Section 119(e) to U.S. Provisional Patent Application No. 62/407,153, filed Oct. 12, 2016 and titled "ReasoNet: Learning to Read using Machine Comprehension," the entire disclosure of which is hereby incorporated by reference herein.

BACKGROUND

Today's connected environment includes a tremendous variety of content, such as electronic documents, web pages, databases, and so forth. Processing this content to identify meaningful portions of the content, however, is challenging in view of the sheer volume of content. Thus, automated technologies have been developed to "read" content and to answer queries about the content. Currently these technologies take a static approach to reading content and thus are typically unable to adapt to changes in volume and complexity of the content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for iterative query-based analysis of text are described. According to various implementations, a neural network architecture is implemented receives a query for information about text content, and iteratively analyzes the content using the query. During the analysis a state of the query evolves until it reaches a termination state, at which point the state of the query is output as an answer to the initial query.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Techniques for iterative query-based analysis of text are described. According to various implementations, a neural network architecture is implemented receives a query for information about text content, and iteratively analyzes the content using the query. During the analysis a state of the query evolves until it reaches a termination state, at which point the state of the query is output as an answer to the initial query. As further detailed herein, a number of iterations of the neural network to determine an answer is dynamic based on different queries and different instances of content. Thus, the described architecture provides a more accurate paradigm for automated content reading and querying as compared to current fixed-turn content analysis techniques.

In the following discussion, an example environment is first described that is operable to employ techniques described herein. Next, some example scenarios are described for iterative query-based analysis of text in accordance with one or more implementations. Following this, some example procedures are described in accordance with one or more implementations. Finally, an example system and device are described that are operable to employ techniques discussed herein in accordance with one or more implementations.

Having presented an overview of example implementations in accordance with one or more implementations, consider now an example environment in which example implementations may by employed.

Figure 1:
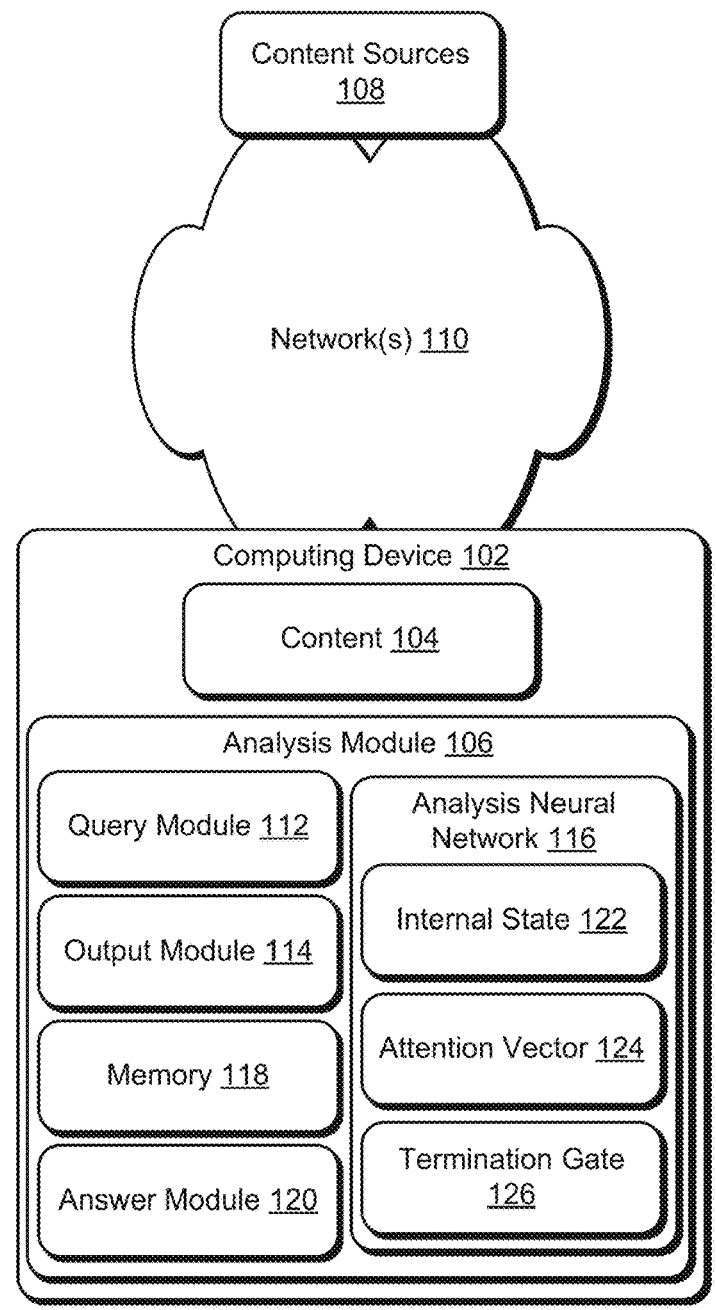
FIG. 1 is an illustration of an environment in an example implementation that is operable to employ techniques discussed herein.

FIG. 1 is an illustration of an environment 100 in an example implementation that is operable to employ techniques for iterative query-based analysis of text described herein. The environment 100 includes a computing device 102, which is representative of a device configured to perform various aspects of iterative query-based analysis of text described herein. The computing device 102 may be configured in a variety of ways, such as a desktop personal computer, a server, a laptop, a wireless cellular phone (e.g., a smartphone), a tablet, and so forth. One example implementation of the computing device 102 is presented below as the computing device 602 of FIG. 6.

The computing device 102 includes and/or has access to content 104 and an analysis module 106. Generally, the content 104 represents a discrete collection and/or collections of text-based content, such as electronic documents, web pages, database entries, and so forth. Generally, the content 104 is made up of human-readable phrases that combine to have meaning in various contexts, such as pertaining to current events (e.g., world news), academia, government organizations, healthcare, enterprise concerns, social media, and so forth. The content 104 may reside locally on the computing device 102, and/or may be obtained from remote content sources 108 over a network 110.

The analysis module 106 is representative of functionality to process the content 104 and answer queries about the content 104. To enable this functionality, the analysis module 106 includes a query module 112, an output module 114, and an analysis neural network ("analysis network") 116 stored on the computing device 102 and with access to a memory 118 and an answer module 120. The query module 112 generally represents functionality to enable a query to be entered for querying the content 104. For instance, the query module 112 can present a graphical user interface (GUI) that enables a user to enter a text-based query for information about the content 104. The output module 114 is representative of functionality for outputting an answer to a query pertaining to the content 104, such as via graphical text-based output, audio output, print-based output, and so forth. The memory 118 generally represents a collection of vector representations of individual words in the content 104 which can be accessed by the analysis network 116 to answer a query.

The analysis network 116 is representative of functionality to process the content 104 and to enable a query entered via the query module 112 to be answered, and an answer to be output via the output module 114. Accordingly, the analysis network 116 includes various components that interact to enable this functionality, including:

Internal State 122: The internal state 122 is a vector representation of a current query state. As further detailed below, when a query is submitted and the content 104 is processed, the internal state 122 can evolve until a termination state is reached and an answer to the query is output.

Attention Vector 124: The attention vector 124 is generated based on a current state of the internal state 122 and the memory 118. Generally, the attention vector 124 evolves as the analysis module 106 processes the content 104 until an answer to a query is obtained.

Termination Gate 126: The termination gate 126 generates a variable based on the current internal state 122. As further detailed below, the termination gate 126 allows the analysis network to iteratively analyze the content 104 until the internal state 122 indicates that an answer to a query is identified. At this point, the termination gate 126 variable is set to true and the analysis module 106 outputs an answer to a query.

According to various implementations, the answer module 120 outputs an answer to a query when a variable of the termination gate 126 is true. The answer module 120, for instance, determines a current state of the internal state 122 representing an answer to a query, and interfaces with the output module 114 to cause the computing device 102 to output the answer in human-perceptible form.

As mentioned above, the content 104 may be obtained from the content sources 108 over a network 110. The content sources 108 generally represent any source of text-based content and/or content that can be converted into text-based content. Examples of the content sources include websites, enterprise institutions, educational institutions, government institutions, data repositories, and so forth. The network 110 is representative of different connected components that exchange, process, and/or route data to enable different forms of communication. Examples of the network 110 include a local access network (LAN), wide area network (WAN), the Internet, a wireless cellular communication network, an Internet of Things (IoT) network, and combinations thereof. The network 110, for instance, represents a combination of interconnected wireless and wired networks that enable content to be obtained by the computing device 102.

Having described an example environment in which the techniques described herein may operate, consider now some example implementation scenarios for iterative query-based analysis of text in accordance with one or more implementations.

Figure 2:
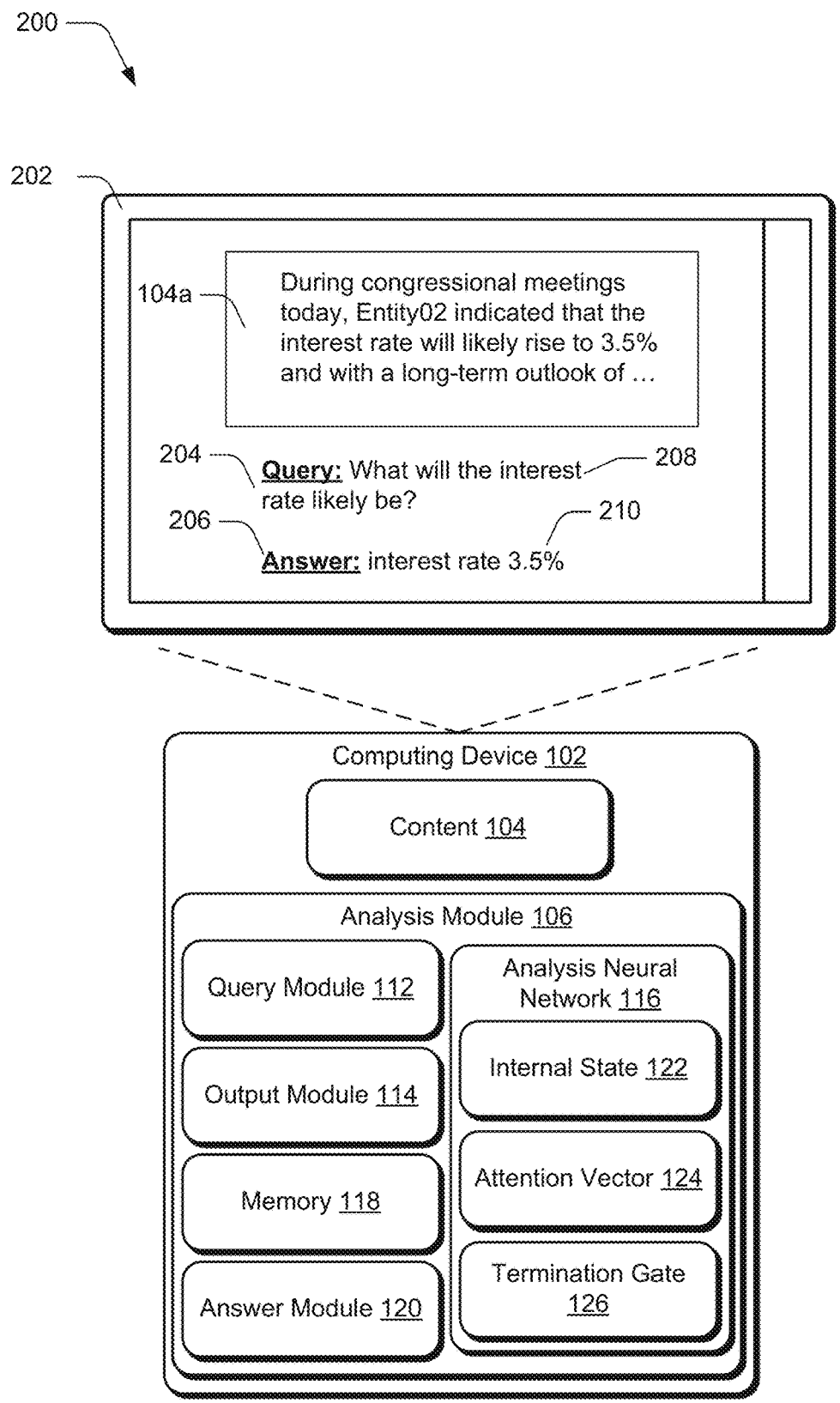
FIG. 2 depicts an example implementation scenario for answering query in accordance with one or more implementations.

FIG. 2 depicts an example implementation scenario 200 for answering query in accordance with one or more implementations. The scenario 200 includes content 104a displayed on a display device 202 of the computing device 102. In this particular example, the content 104a represents text-based financial information, such as from a financial news website. A query field 204 and an answer field 206 are also displayed. In at least some implementations, the query field 204 is presented by the analysis module 106 and represents functionality for submitting a query to the query module 112. Further, the answer field 206 is presented by the analysis module 106 and is configured to output an answer identified by the answer module 120.

In the scenario 200, a query 208 is input into the query field 204. Accordingly, the analysis module 106 processes the query 208 and the content 104a using the analysis network 116 to obtain an answer 210 to the query 208. The content 104a and the query 208, for instance, are processed according to techniques for iterative query-based analysis of text described herein to obtain the answer 210. The answer 210 is then output via the answer field 206.

Although the scenario 200 is depicted with reference to content 104 that is visually displayed, it is to be appreciated that stored content 104 that is not displayed may be processed according to techniques for iterative query-based analysis of text described herein to answer a query regarding the content.

Figure 3:
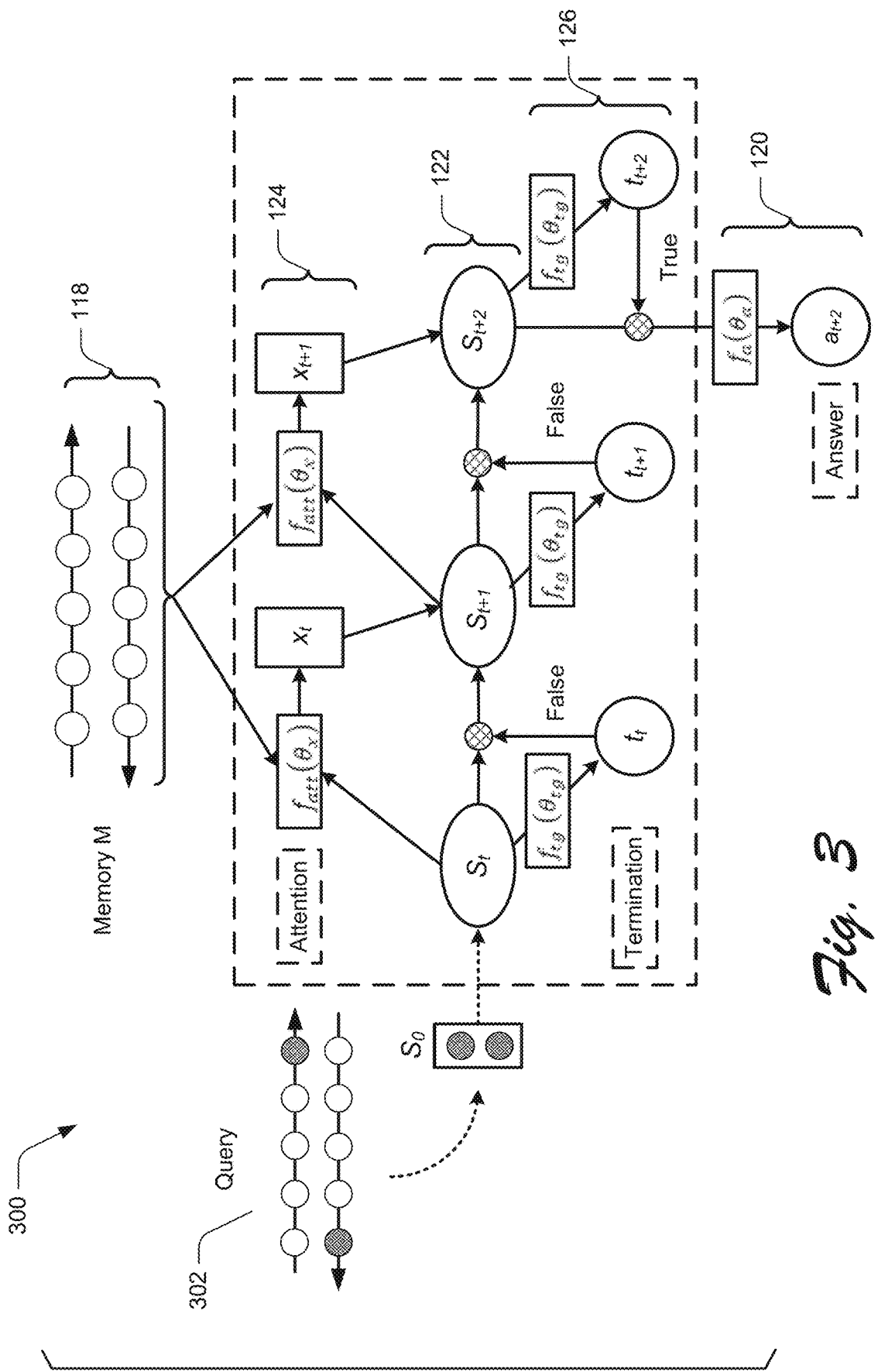
FIG. 3 depicts an example architecture for a neural network in accordance with one or more implementations.

FIG. 3 depicts an example architecture 300 for the analysis network 116 in accordance with one or more implementations. Depicted in the architecture 300 are:

A Query 302: The query 302 represents a text-based query for information about a set of content 104.

The Internal state 122: The internal state 122 is denoted as S which is a vector representation of a query state for the query 302. Typically, the initial state $s_1$ is a last-word vector representation of the query 302 by the analysis network 116. The t-th time step of the internal state 122 is represented by $s_t$. The sequence of the internal state 122 is modeled by an Analysis Network (AN): $s_{t+1} = AN(s_t, x_t; \theta s)$.

The Memory 118: The memory 118 is denoted as M. It is a list of word vectors generated from an instance of content 104, $M = \{m_i\}_{i=1} \ldots D$, where $m_i$ is a fixed dimensional vector. In machine comprehensive tasks, $m_i$ is the vector representation of each word in the content 104 by the analysis network 116.

The Attention vector 124: The attention vector 124 is denoted as $x_t$ and is generated based on the current internal state $s_t$ and the external memory M: $x_t = f_{att}(s_t, M; \theta_x)$.

The Termination gate 126: The termination gate 126 generates a stochastic random variable according to the current internal state; $t_t \sim p(\cdot | f_{tg}(s_t; \theta_{tg}))$. $t_t$ is a binary random variable. If $t_t$ is true, the analysis network 116 stops iterating, and the answer module 120 executes at time step t to output an answer to a query; otherwise the analysis network 116 generates an attention vector $x_{t+1}$, and feeds the vector into the state network to update the next internal state $s_{t+1}$.

The Answer module 120: The action of answer module 120 is triggered when the termination gate 126 variable is true: $a_t \sim p(\cdot | f_a(s_t; \theta_a))$.

The following Analysis Algorithm describes a stochastic inference process of the analysis network 116.

Analysis Algorithm: Stochastic Inference in the Analysis Network 116:
  Input: Memory M; Initial state s1; Step t=1; Maximum Step $T_{max}$ Step $T_{max}$
  Output: Termination Step T, Answer $a_T$
  1 Sample $t_t$ from the distribution $p(\cdot | f_{tg}(s_t; \theta_{tg}))$;
  2 if $t_t$ is false, go to Step 3; otherwise Step 6;
  3 Generate attention vector $x_t = f_{att}(s_t, M; \theta_x)$;

4 Update internal state $s_{t+1}=AN(s_t, x_t; \theta_s)$;
5 Set t=t+1; if t<$T_{max}$ go to Step 1; otherwise Step 6;
6 Generate answer $a_t \sim p(\cdot|f_a(s_t; \theta_a))$;
7 Return T=t and $a_T=a_t$;

The Analysis Algorithm describes a stochastic inference process of the analysis network 116. As indicated, the process iterates until a termination gate 126 is true, at which point an answer is output.

Generally, the state sequence $s_{1:T}$ is hidden and dynamic, and controlled by an analysis network 116 sequence model. The analysis network 116 performs an answer action $a_T$ at the T-th step, which implies that the termination gate variables $t_{1:T}=(t_1=0, t_2=0, \ldots, t_{T-1}=0, t_T=1)$. The analysis network 116 learns a stochastic policy $\pi((t_t, a_t)|s_t; \theta)$ with parameters $\theta$ to get a distribution of termination actions, to continue analyzing content or to stop, and answer actions if the analysis network 116 decides to stop at the current step. The termination step T varies from instance to instance, depending on the content 104 and the query 302.

According to various implementations, the parameters $\theta$ of the analysis network 116 are given by the parameters of the embedding matrices W, attention network $\theta_x$, the state of the analysis network 116 network $\theta_s$, the answer action network $\theta_a$, and the termination gate network $\theta_{tg}$. As part of a training process for the analysis network 116, the parameters $\theta=\{W, \theta_x, \theta_s, \theta_a, \theta_{tg}\}$ are trained by maximizing the total expect reward. The expected reward for an instance is defined as:

$$J(\theta) = E_{\pi(t1:T, aT;\theta)}|\Sigma_{t=1}^T r_t|$$

In at least some implementations, the reward can only be received at the final termination step when an answer action $a_T$ is performed. We define $r_T=1$ if $t_T=1$ and the answer is correct, and $r_T=0$ otherwise. The rewards on intermediate steps are zeros, $\{r_t=0\}_{t=1 \ldots T-1}$.] can be maximized by directly applying gradient based optimization methods. The gradient of J is given by:

$$\nabla_\theta J(\theta) = E_{\pi(t1:T, aT;\theta)}[\nabla_\theta \log \pi(t_{1:T}, a_T; \theta) r_T]$$

Then we compute $\nabla \theta J(\theta)$:

$$E_{\pi(t1:T, aT;\theta)}[\nabla_\theta \log \pi(t_{1:T}, a_T;\theta) r_T] = \Sigma_{(t1:T, aT) \in A^\dagger} \pi(t_{1:T}, a_T;\theta)[\nabla \theta \log \pi(t_{1:T}, a_T;\theta)(r_T - b_T)]$$

where $A^\dagger$ is all the possible episodes, T, $t_{1:T}$, $a_T$ and $r_T$ are the termination step, termination action, answer action, and reward, respectively, for the $(t_{1:T}, a_T)$ episode. $b_T$ is called the reward baseline in the RL literature to lower variance. It is common to select $b_T=E_\pi [r_T]$, and can be updated via an online moving average approach: $b_T=\lambda b_T+(1-\lambda)r_T$.

At least some implementations for training the analysis network 116 use an instance-based baseline method called Contrastive Reward to calculate $\nabla_\theta J(\theta)$. The basic idea of Contrastive Reward is to utilize an instance-based baseline assignment. Consider, for instance, the following discussion of training the analysis network 116.

To enable the analysis network 116 to process content, a training dataset can be simplified as a collection of triplets of query q, passage p, and answer a. Say $(q_n, p_n, a_n)$ is the n-th training instance.

The first step is to extract memory M from $p_n$ by mapping each symbolic in the passage to a contextual representation given by the concatenation of forward and backward AN hidden states, i.e., $m_k=[\vec{p}_n^{\,k}, \overleftarrow{p}_n^{\,p_n-k+1}]$, and extract initial state $s_1$ from $q_n$ by assigning $s_1=[\vec{q}_n^{\,|q_n|}, \overleftarrow{q}_n^{\,1}]$. Given M and $s_1$ for the n-th training instance, a the analysis network 116 executes $|A^\dagger|$ episodes, where all possible episodes $A^\dagger$ can be enumerated by setting a maximum step. Each episode generates actions and a reward from the last step:

$$\langle (t_{1:T}, a_T), r_T \rangle_{(t1:T, aT) \in} \mathbb{A}\dagger.$$

Therefore, the gradient of J can be rewritten as:

$$\nabla_\theta J(\theta) = \sum_{(t_{1:T}, a_T) \in \mathbb{A}^\dagger} \pi(t_{1:T}, a_T;\theta)[\nabla_\theta \log \pi(t_{1:T}, a_T;\theta)(r_T - b)]$$

where the baseline $b=\Sigma_{(t_{1:T}, a_T) \in} \mathbb{A}\dagger \pi(t_{1:T}, a_T; \theta) r_T$ is the average reward on the $|A^\dagger|$ episodes for the n-th training instance. This allows different baselines for different training instances, which is beneficial since the complexity of training instances varies significantly. Since the sum of the proposed rewards over $|A^\dagger|$ episodes is zero, $\Sigma_{(t_{1:T}, a_T) \in} \mathbb{A}\dagger \pi(t_{1:T}, a_T; \theta)(r_T-b)=0$, the training process may be referred to as contrastive reward. In experiments, it is found empirically find using $$\left(\frac{r_T}{b}\right) - 1$$

in place of $(r_t-b)$ can lead to a faster convergence.

Discussing a walk-through of the architecture 300, we start with the query 302 and content 104 represented by the word vectors in the memory 118. We then scan the query 302 and the memory 118, such as using a long short-term memory (LSTM) model. From this we get a first word and last word of the query 302, represented by the shaded nodes of the query 302. The first word and last word of the query 302 are concatenated to get the first state $s_0$ of the query 302. We then begin reading word vectors from the memory 118 and by applying the attention vector 124 we get an output $x_t$. We then use $x_t$ to rewrite the internal state 122 to be $S_{t+1}$. As the analysis network 116 iterates, the attention vector analyzes different portions (words and/or phrases) represented in the memory 118 to evolve the internal state 122. This enables a correct answer to be identified with more confidence.

Generally, for each internal state 122 we have a termination gate 126 $t_n$ which determinates whether we continue iterating through the memory 118, or whether we output an answer 120. In this particular example, $s_t$ and $s_{t+1}$ do not terminate, but at $s_{t+2}$ the termination gate 126 evaluates true and thus we terminate and output an answer 120. This trains the analysis network 116 to recognize the answer 120 as being a correct output.

According to various implementations, the termination gates t represent stochastic variables that can evaluate as either 1 (true, output an answer) or 0 (false, continue processing the memory 118). When a termination gate 126 evaluates as true, we output the current state of the query 302, in this case $s_{t+2}$, as the answer 120.

Having discussed some example implementation scenarios, consider now a discussion of some example procedures in accordance with one or more implementations.

The following discussion describes some example procedures for iterative query-based analysis of text in accordance with one or more implementations. The example procedures may be employed in the environment 100 of FIG. 1, the system 600 of FIG. 6, and/or any other suitable environment. The procedures, for instance, represent example ways of performing various aspects of the scenarios described above. In at least some implementations, the steps described for the various procedures can be implemented automatically and independent of user interaction.

Figure 4:
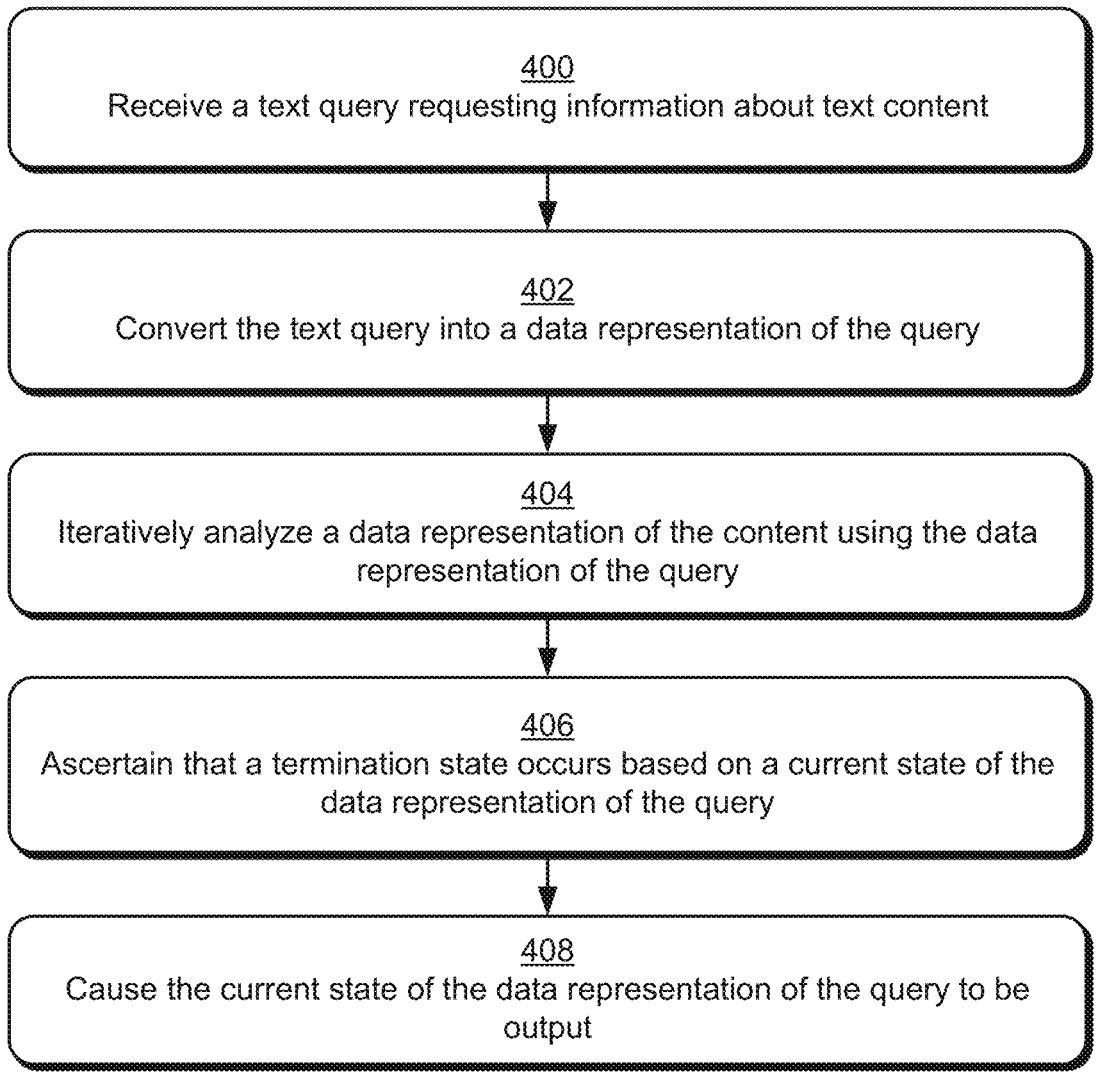
FIG. 4 is a flow diagram that describes steps in a method for iteratively analyzing content based on a query for information about the content in accordance with one or more implementations.

FIG. 4 is a flow diagram that describes steps in a method in accordance with one or more implementations. The method, for instance, describes an example way of iteratively analyzing content based on a query for information about the content.

Step 400 receives a text query requesting information about text content. The text query, for instance, is received as text input from a user.

Step 402 converts the text query into a data representation of the query. For example, the analysis module 106 converts the text query into a vector representation of the query. In at least one implementation, the vector representation represents a first word and a last word of the query for processing by the analysis network 116.

Step 404 iteratively analyzes a data representation of the content using the data representation of the query. The analysis, for instance, causes the data representation of the query to be applied to different portions of the data representation of the content, which causes a state of the data representation of the query to evolve as the different portions of the data representation of the content are analyzed.

Step 406 ascertains that a termination state occurs based on a current state of the data representation of the query. As discussed above, the termination state is generally based a variable maintained by the termination gate 126. For instance, when the variable is 0, iterative analysis of the content continues. However, when the variable is 1, iterative analysis of the content stops and a current state of the internal state 122 is output as an answer to the query.

Step 408 causes the current state of the data representation of the query to be output. The current state of the data representation of the query, for example, represents a current state of the internal state 122. The current state can be output in various ways, such via a termination event indicating that iteration of the analysis network 116 has terminated, via visual and/or audible output of the answer, and so forth.

Figure 5:
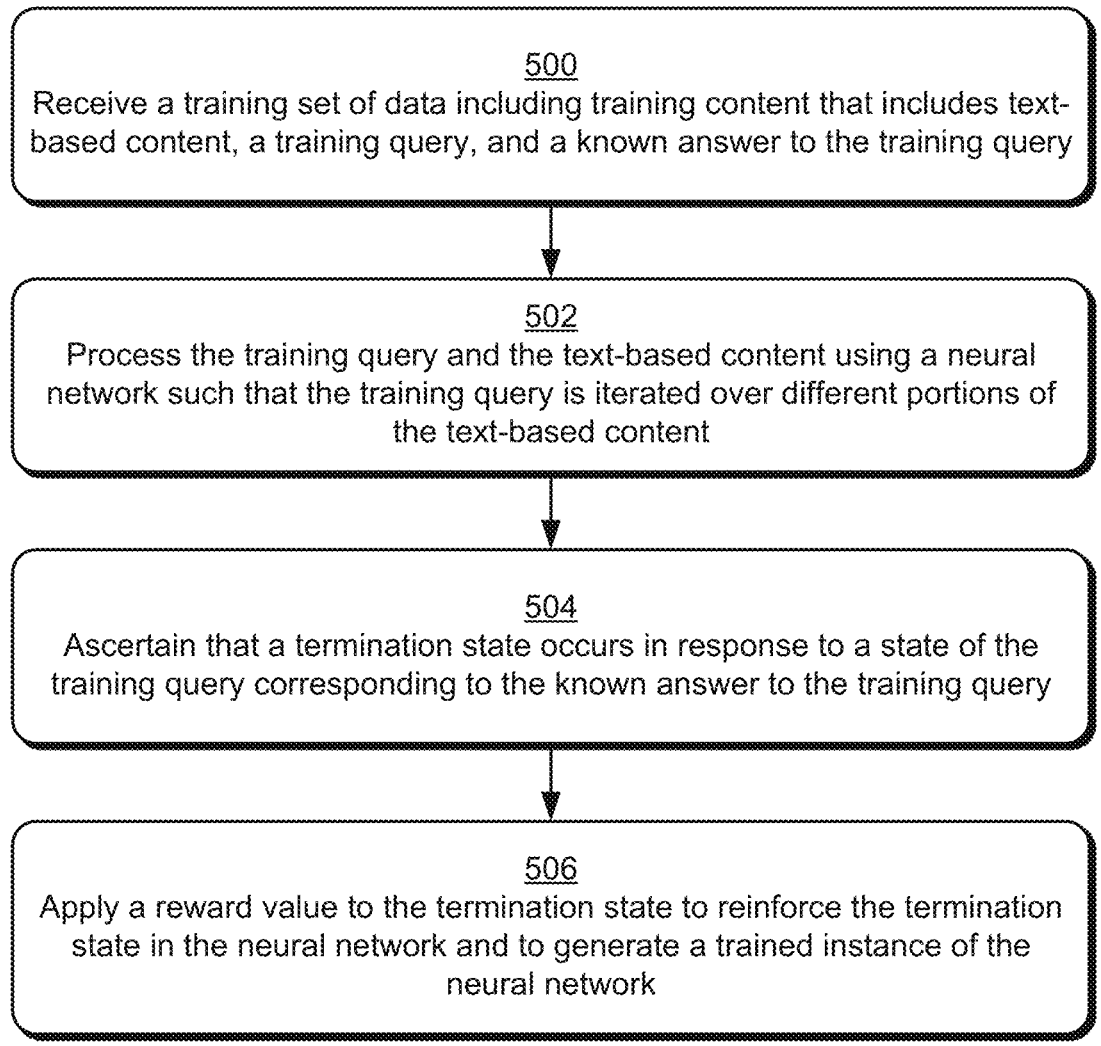
FIG. 5 is a flow diagram that describes steps in a method for training a neural network in accordance with one or more implementations.

FIG. 5 is a flow diagram that describes steps in a method in accordance with one or more implementations. The method, for instance, describes an example way of training a neural network.

Step 500 receives a training set of data including training content that includes text-based content, a training query, and a known answer to the training query. The analyses module 116, for instance, receives this information such as from a local data storage and/or from a remote data storage. Generally, the known answer comprises an answer to the query that is known prior to the training process.

Step 502 processes the training query and the text-based content using a neural network such that the training query is iterated over different portions of the text-based content. Different aspects of employing the analysis network 116 for iterative analysis of content are described above.

Step 504 ascertains that a termination state occurs in response to a state of the training query corresponding to the known answer to the training query. In at least one implementation, the termination state is based on a state of the internal state 122, and can be triggered based on a variable maintained by the termination gate 126.

Step 506 applies a reward value to the termination state to reinforce the termination state in the neural network and to generate a trained instance of the neural network. Generally, applying the reward value weights the analysis network 116 toward the termination state in a future content analyses using the analysis network 116.

Accordingly, techniques for iterative query-based analysis of text described herein enable efficient and comprehensive analysis of text content to answer a query about the content. According to various implementations, a number of iterations of a neural network used to analyze content is dynamic (e.g., not fixed or predetermined) and may vary based on size and complexity of the content. Further, the architecture of the neural network provides a more efficient approach to determining a correct answer to a query for information about content, thus conserving device resources such as processor bandwidth and battery life.

Having discussed some example procedures, consider now a discussion of an example system and device in accordance with one or more implementations.

Figure 6:
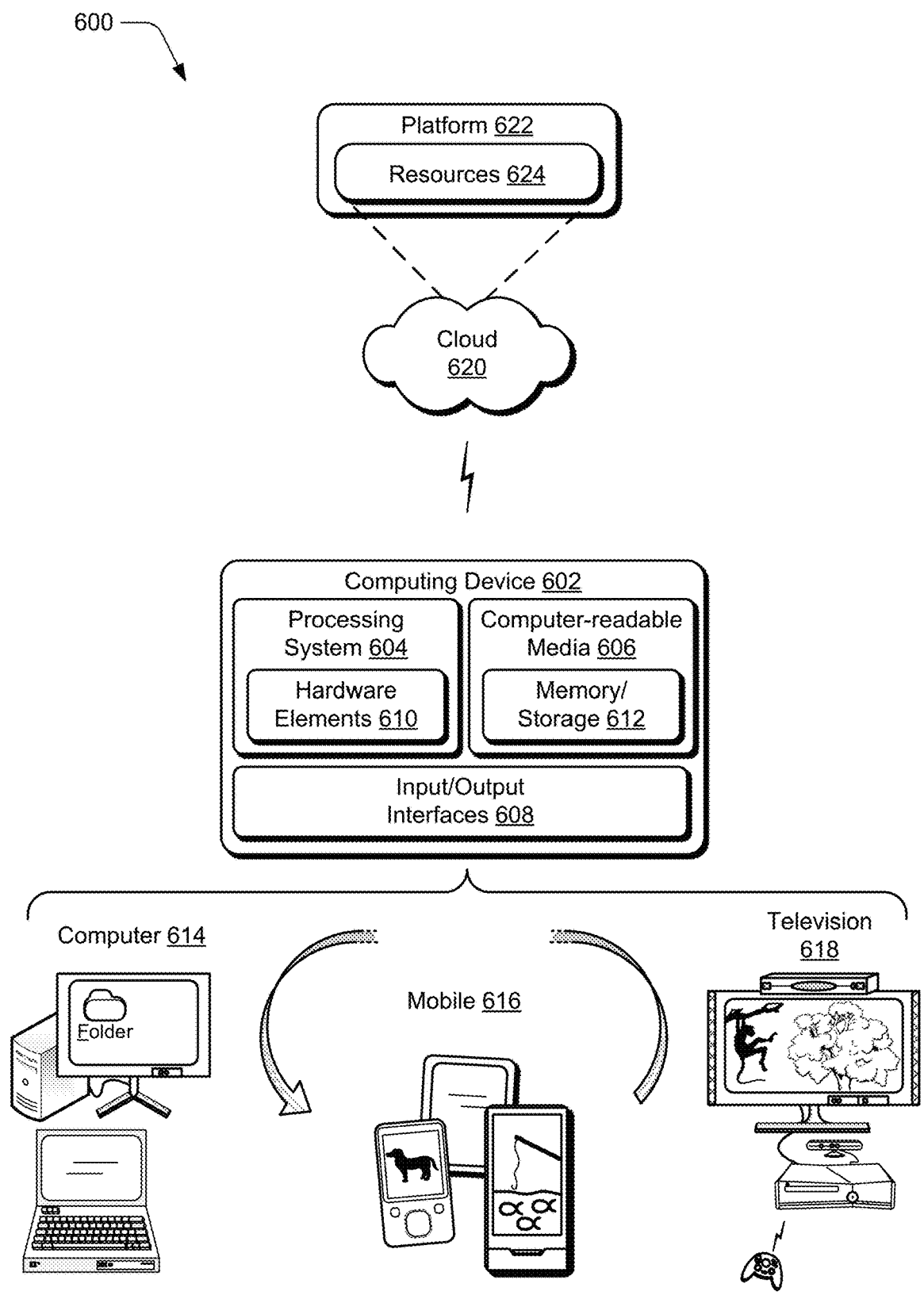
FIG. 6 illustrates an example system and computing device as described with reference to FIG. 1, which are configured to implement implementations of techniques described herein.

FIG. 6 illustrates an example system generally at 600 that includes an example computing device 602 that is representative of one or more computing systems and/or devices that may implement various techniques described herein. For example, the computing device 102 discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more Input/Output (I/O) Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 610 and computer-readable media 606 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules that are executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the computing device 102 may be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device implementation, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for using a neural network to answer a query for information about content, the system comprising: at least one processor; and one or more computer-readable storage media storing a neural network that is executable by the at least one processor to implement functionality including: an internal state to represent a state of a query for information about text-based content, the internal state evolving as different portions of the text-based content are analyzed; an attention vector to be applied to different portions of the text-based content to cause the internal state to evolve; and a termination gate to evaluate the internal state and to terminate analysis of the text-based content in response to occurrence of a termination criterion, and to cause the internal state to be output as an answer to the query in response to termination of the analysis.

In addition to any of the above described systems, any one or combination of: further comprising a memory storing a vector representation of words from the content, the internal state comprising a vector representation of the state of the query that evolves as different portions of the vector representation of the words from the content are analyzed; wherein the internal state includes an initial state comprising a first word and a last word of the query; wherein the attention vector is generated at least in part based on a current state of the internal state; wherein the termination gate maintains a variable that varies according to the internal state, and the termination criterion comprises a change in a state of the variable; wherein the termination criterion is based on a current state of the internal state; wherein the neural network is executable by the at least one processor to iteratively apply the attention vector to the different portions of the text based content until the termination criterion occurs based on a current state of the internal state; further comprising a memory that is external to the neural network and that stores vector representations of words of the content, the attention vector being applied to the vector representations to cause the internal state to evolve; further comprising a query module configured to receive the query as text input, the system configured to convert the text input into a vector representation of the query to generate an initial state of the internal state; wherein the internal state includes an initial state that is generated based on the query, and wherein the initial state evolves into a final state that represents the answer to the query.

A computer-implemented method for automated answering of a query for information about content, the method comprising: receiving a text query requesting information about text content; iteratively analyzing a data representation of the content using a data representation of the query such that the data representation of the query is applied to different portions of the data representation of the content and a state of the data representation of the query evolves as the different portions of the data representation of the content are analyzed; ascertaining that a termination state occurs based on a current state of the data representation of the query; and causing the current state of the data representation of the query to be output.

In addition to any of the above described methods, any one or combination of: further comprising receiving the text query as text input, and converting the text input into a vector representation of one or more words of the query, the data representation of the query comprising the vector representation of the one or more words of the query; wherein the data representation of the set of content comprises vector representations of words of the content, and the data representation of the query comprises a vector representation of one or more words of the query; wherein the data representation of the query comprises a data representation of a first word and a last word of the query; wherein said iteratively analyzing is performed via a neural network that maintains a termination gate with a variable determined based on the state of the data representation of the query, and wherein the termination criterion occurs based on a change in the variable; further comprising causing the current state of the data representation of the query to be output as an answer to the query; wherein the current state of the data representation of the query comprises one or more words from the content.

A computer-implemented method for training a neural network, the method comprising: receiving a training set of data including training content that includes text-based content, a training query, and a known answer to the training query; processing the training query and the text-based content using the neural network such that the training query is iterated over different portions of the text-based content; and ascertaining that a termination state occurs in response to a state of the training query corresponding to the known answer to the training query; and applying a reward value to the termination state to reinforce the termination state in the neural network and to generate a trained instance of the neural network.

In addition to any of the above described methods, any one or combination of: wherein said processing causes the state of the training query to evolve from an initial state to a final state that represents the known answer to the query; further comprising evaluating a termination gate of the neural network at each iteration of the training query to determine whether the termination state occurs.

Techniques for iterative query-based analysis of text are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A system comprising:
   at least one processor; and
   one or more computer-readable storage media storing a neural network that is executable by the at least one processor to implement functionality comprising:
      an internal state to represent a state of a query for information about text-based content, the internal state evolving as different portions of the text-based content are analyzed;
      an attention vector to be applied to different portions of the text-based content to cause the internal state to iteratively evolve from an initial state denoting a first vector representation of the state of the query through a plurality of subsequent states as the different portions of the text-based content are analyzed; and
      a termination gate to:
         maintain the internal state, wherein a termination criterion comprises a change in the internal state;
         evaluate the internal state and to terminate analysis of the text-based content in response to an occurrence of the termination criterion;
         to cause the internal state to be output as an answer to the query in response to termination of the analysis;
         apply a reward value to a termination state and generate a trained instance of the neural network; and
         in response to the termination criterion having a false value, generate an updated attention vector, and feed the updated attention vector into a state network to update a next internal state.

2. A system as recited in claim 1, wherein the initial state comprising a first word and a last word of the query.

3. A system as recited in claim 1, wherein the attention vector is generated at least in part based on a current state of the internal state.

4. A system as recited in claim 1, wherein the termination criterion is based on a current state of the internal state.

5. A system as recited in claim 1, wherein the neural network is executable by the at least one processor to iteratively apply the attention vector to the different portions of the text-based content until the termination criterion occurs based on a current state of the internal state.

6. A system as recited in claim 1, further comprising a memory that is external to the neural network and that stores vector representations of words of the text-based content, the attention vector being iteratively applied to the vector representations of words of the text-based content to cause the internal state to evolve.

7. A system as recited in claim 1, wherein the neural network is configured to implement functionality further comprising receiving the query as text input, the system configured to convert the text input into a vector representation of the query to generate the initial state of the internal state.

8. A system as recited in claim 1, wherein the initial state is generated based on the query, and wherein the initial state evolves into a final state that represents the answer to the query.

9. A computer-implemented method, comprising:
   receiving, via a computer network, a text query requesting information about text content;
   automatically converting the text query into a data representation of the query;
   iteratively analyzing, via a neural network, a data representation of the text content using the data representation of the query such that the data representation of the query is applied to different portions of the data representation of the content and a state of the data representation of the query iteratively evolves from an initial state denoting a first vector representation of the query through a plurality of internal states denoting different vector representations of the query as the different portions of the data representation of the content are analyzed;
   at a termination gate, maintaining the state of the data representation of the query, wherein a termination criterion occurs based on a change in that state of the data reprensentation of the query, and ascertaining whether a termination state occurs based on a current state of the data representation of the query;
   responsive to an occurrence of a termination state, terminating analysis of the text content, and causing the current state of the data representation of the query to be output;
   responsive to the occurrence of the termination state, apply a reward value to the termination state and generate a trained instance of the neural network; and
   responsive to ascertaining that the termination state has not occurred following an iteration, generating an updated vector representation of the query, and feeding the updated vector representation of the query into the neural network to update a next internal state.

10. A method as described in claim 9, further comprising receiving the text query as text input, and converting the text input into a vector representation of one or more words of the query, the data representation of the query comprising the vector representation of the one or more words of the query.

11. A method as described in claim 9, wherein the data representation of the text content comprises vector representations of words of the content, and each vector representation of the query comprises a vector representation of one or more words of the query.

12. A method as described in claim 9, wherein the data representation of the query comprises a data representation of a first word and a last word of the query.

13. A method as described in claim 9, further comprising causing the current state of the data representation of the query to be output as an answer to the query.

14. A method as described in claim 9, wherein the current state of the data representation of the query comprises one or more words from the text content.

15. A computer-implemented method for training a neural network, the method comprising:
receiving a training set of data including training content that includes text-based content, a training query, and a known answer to the training query;
processing the training query and the text-based content using the neural network such that the training query is iterated over different portions of the text-based content causing an internal state to iteratively evolve from an initial state through a plurality of states as the training query is processed;
at a termination gate of the neural network, maintaining the internal state, wherein a termination criterion comprises a change in the internal state;
evaluating the termination gate of the neural network at each iteration of the training query to determine whether a termination state occurs;
in response to ascertaining that a termination state has not occurred following an iteration, causing the internal state to evolve to a next state;
ascertaining that a termination state occurs in response to a state of the training query corresponding to the known answer to the training query, the termination state being based at least on the internal state; and
applying a reward value to the termination state to reinforce the termination state in the neural network and to generate a trained instance of the neural network.

16. A method as described in claim 15, wherein said processing causes the state of the training query to evolve from the initial state to a final state that represents the known answer to the query.

* * * * *